United States Patent [19]

Cohen et al.

[11] Patent Number: 5,664,190

[45] Date of Patent: Sep. 2, 1997

[54] SYSTEM AND METHOD FOR ENABLING AN EVENT DRIVEN INTERFACE TO A PROCEDURAL PROGRAM

[75] Inventors: Marc Leslie Cohen, Boca Raton, Fla.; Scott Michael Consolatti; Carol Ann Jones, both of Raleigh, N.C.; Dennis Donald King, Cary, N.C.

[73] Assignee: International Business Machines Corp., Armonk, N.Y.

[21] Appl. No.: 184,729

[22] Filed: Jan. 21, 1994

[51] Int. Cl.[6] .............................. G06F 9/40; G06F 9/44
[52] U.S. Cl. ........................................................ 395/670
[58] Field of Search ................................. 395/650, 700, 395/670

[56] References Cited

U.S. PATENT DOCUMENTS

| | | | |
|---|---|---|---|
| 4,896,290 | 1/1990 | Rhodes et al. | 395/670 |
| 5,018,089 | 5/1991 | Kanazawa | 364/578 |
| 5,061,916 | 10/1991 | French et al. | 340/522 |
| 5,455,951 | 10/1995 | Bolton et al. | 395/700 |
| 5,555,346 | 9/1996 | Gross et al. | 395/50 |
| 5,560,005 | 9/1996 | Hoover et al. | 395/610 |
| 5,600,780 | 2/1997 | Hiraga et al. | 395/334 |

Primary Examiner—Alvin E. Oberley
Assistant Examiner—John W. Chavis
Attorney, Agent, or Firm—Gregory M. Doudnikoff

[57] ABSTRACT

The invention provides a system and method which enable programs written in procedural languages to respond reactively to messages from event driven interfaces. An interface is provided between programs or window procedures written in procedural languages and the standard message queues of a standard event driven user interface, operating system and graphic engine. The interface pulls messages intended for the programs off of the queues and then forwards them to the appropriate program upon receipt of a call from the program.

9 Claims, 4 Drawing Sheets

SYSTEM AND METHOD FOR ENABLING AN EVENT DRIVEN INTERFACE TO A PROCEDURAL PROGRAM

BACKGROUND OF THE INVENTION

1. Technical Field

The present invention relates to a system and technique for permitting a procedural or linear program to be accessed on an event-driven basis. More particularly, the present invention relates to a system and technique which permit programs written in procedural fourth-generation interpretive languages to be responsive to and be accessible by reactive or event-driven programs or input, such as a graphical user interface.

2. Description of the Related Art

A number of different varieties of programming languages exist today, each having its own attributes and characteristics. Among these languages are what are known as procedural fourth-generation interpretive languages. Programs written in such fourth-generation languages are not compiled, but rather are interpreted directly by a computer processor in the form in which they are written by a programmer, with the commands being executed by the processor based on the interpretation of the code written by the programmer. Such languages are typically easier in which to program than are languages which require compilation, and they are attractive because less programmer skill is required to write programs.

Programs written in procedural languages are executed linearly and are also known as command languages. The nature of procedural languages presents a barrier to some potential uses, because procedural programs typically cannot respond interactively to input from a user, but rather are restricted to being initiated through a command input by a user and then carrying out their programmed function to completion. While this type of performance is acceptable for certain functions or applications that computer users might want to have performed or carried out, such performance is not acceptable when users require object based event-driven programs which are reactive and capable of responding to any one of a variety of possible inputs/commands with the desired one of many possible functions or procedures. This requirement is the norm in user interface applications, and graphical user interfaces (GUIs) in particular.

Attempts to make such fourth-generational procedural programs into event-driven applications have met with limited success. For example, one such technique has added a user interface module to the REXX (Restructured EXecutive eXecutor) fourth generational language which causes a user interface window to be displayed on a computer display device. However, this window merely permits a user to access a REXX procedural subroutine which continues until its processing is ended. Such single window modal user interfaces do not turn REXX programs or applications into the type of event driven programs or applications required by today's user interfaces, in which ease of use and a modeless design are prerequisites. For example, today's advanced GUIs permit users to customize or change them through working with the GUI. In contrast, the proposed modal REXX system would leave the user with the requirement of reprogramming the REXX subroutine itself in order to effect any change in the display of the window or in the function of the window.

Accordingly, a need has arisen for a technique for converting or otherwise adapting fourth generation procedural language into event driven programs.

SUMMARY OF THE INVENTION

Accordingly, an object of the present invention is to provide a system and method for making procedures written in fourth generational procedural languages reactive relative to event driven interfaces.

Another object of the subject invention is to provide an interface which enables window procedures written in fourth generational procedural languages to respond reactively to input from a user at a user interface.

Other objects and advantages of the present invention will be set forth in part in the description and the drawings which follow, and, in part, will be obvious from the description, or may be learned by practice, of the invention.

To achieve the foregoing objects, and in accordance with the purpose of the invention as broadly described herein, a system is provided in a computing environment for enabling procedural programs to respond reactively to messages, comprising receiving means for receiving input from the user interface; an operating system for receiving the input from the receiving means; a plurality of message queues for receiving messages from the operating system, one message queue corresponding to each procedural program accessible by the user interface; a procedural program interface for determining whether a message is present in one of the message queues and providing the message to the procedural program following receipt of a call from the procedural program. The procedural program interface may include one procedural program message queue corresponding to each of the message queues and a controller for monitoring receipt of messages from the message queues by the procedural program message queues, monitoring for calls from the procedural programs, and sending the appropriate message to the calling procedural program. The controller may also timestamp the incoming messages, so that the first-received message is provided to the calling procedural program if more than one message is waiting for it.

Also provided is a method for providing messages to procedural window procedures in a computing environment, comprising the steps of determining whether a message for one of the procedural window procedures has been sent from the operating system; storing the sent message; waiting for the procedural window procedure, which corresponds to the stored message, to issue a call for a waiting message; and providing the stored message to the calling procedure window procedure in response to the call.

The present invention will now be described with reference to the following drawings, in which like reference numbers denote the same elements throughout.

DESCRIPTION OF THE PREFERRED EMBODIMENT

Figure 1:
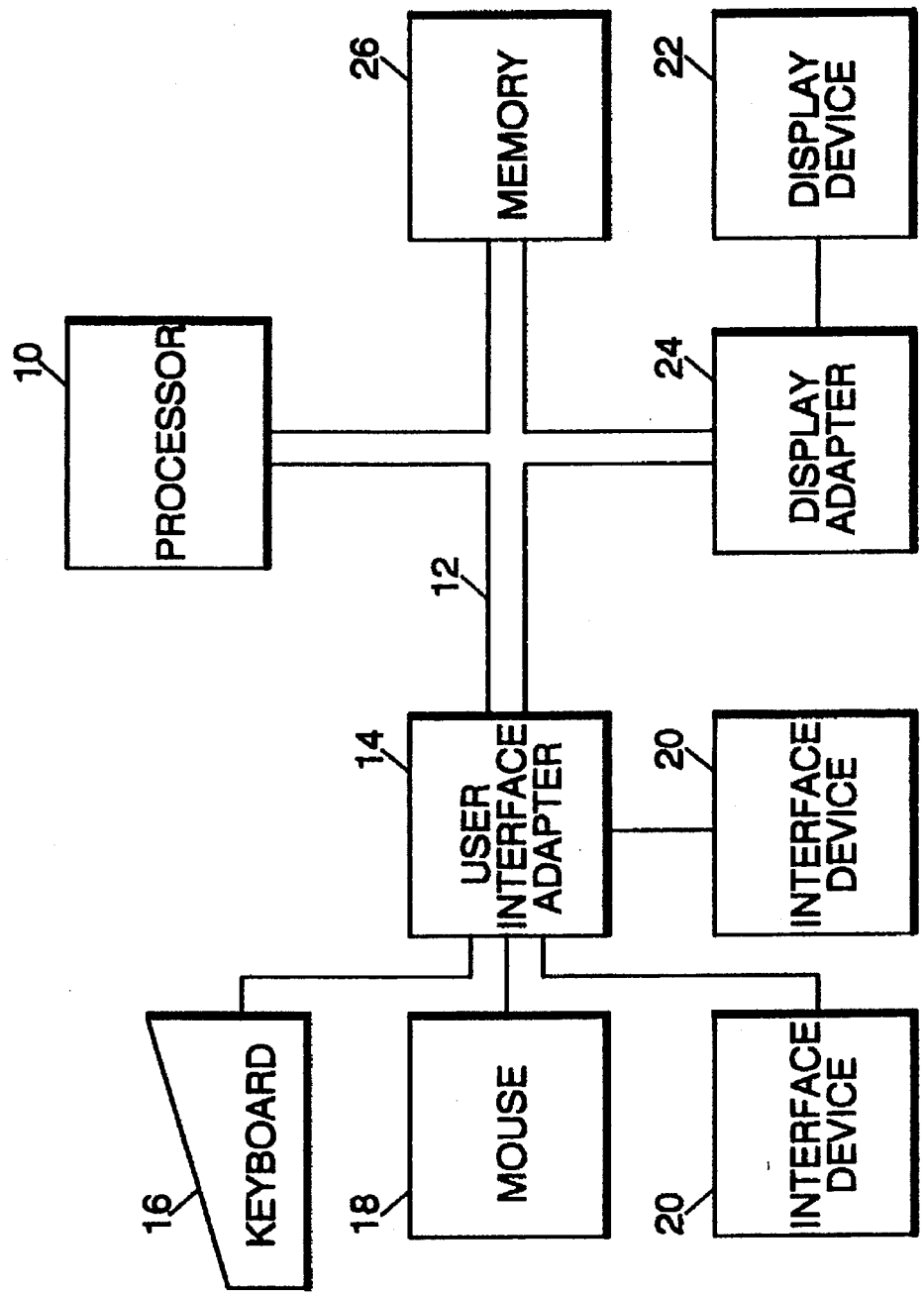
FIG. 1 is a block diagram of a computer hardware environment in which the present invention may be practiced.

An embodiment of the present invention will now be described with initial reference to FIG. 1, which illustrates a representative hardware environment in which the present invention may be practiced. The environment includes a processor 10, which may be the central processing unit (CPU) of a host-based mainframe computer system or the microprocessor of a work station or personal computer or the like. In any case, known means, such as a bus 12, are employed to connect and enable communication between the processor 10 and the components of a user station. The user station will typically include a user interface adapter 14, which connects the processor 10 via the bus 12 to one or more interface devices, such as a keyboard 16, a mouse 18, and/or other interface devices 20, which can be any user interface device, such as a touch sensitive screen, a digitized pen entry pad, etc. The bus 12 also connects a display device 22, such as an LCD screen or CRT, to the processor 10 via a display adapter 24. The bus 12 also connects the processor 10 to memory 26, which can include ROM, RAM, etc.

Figure 2:
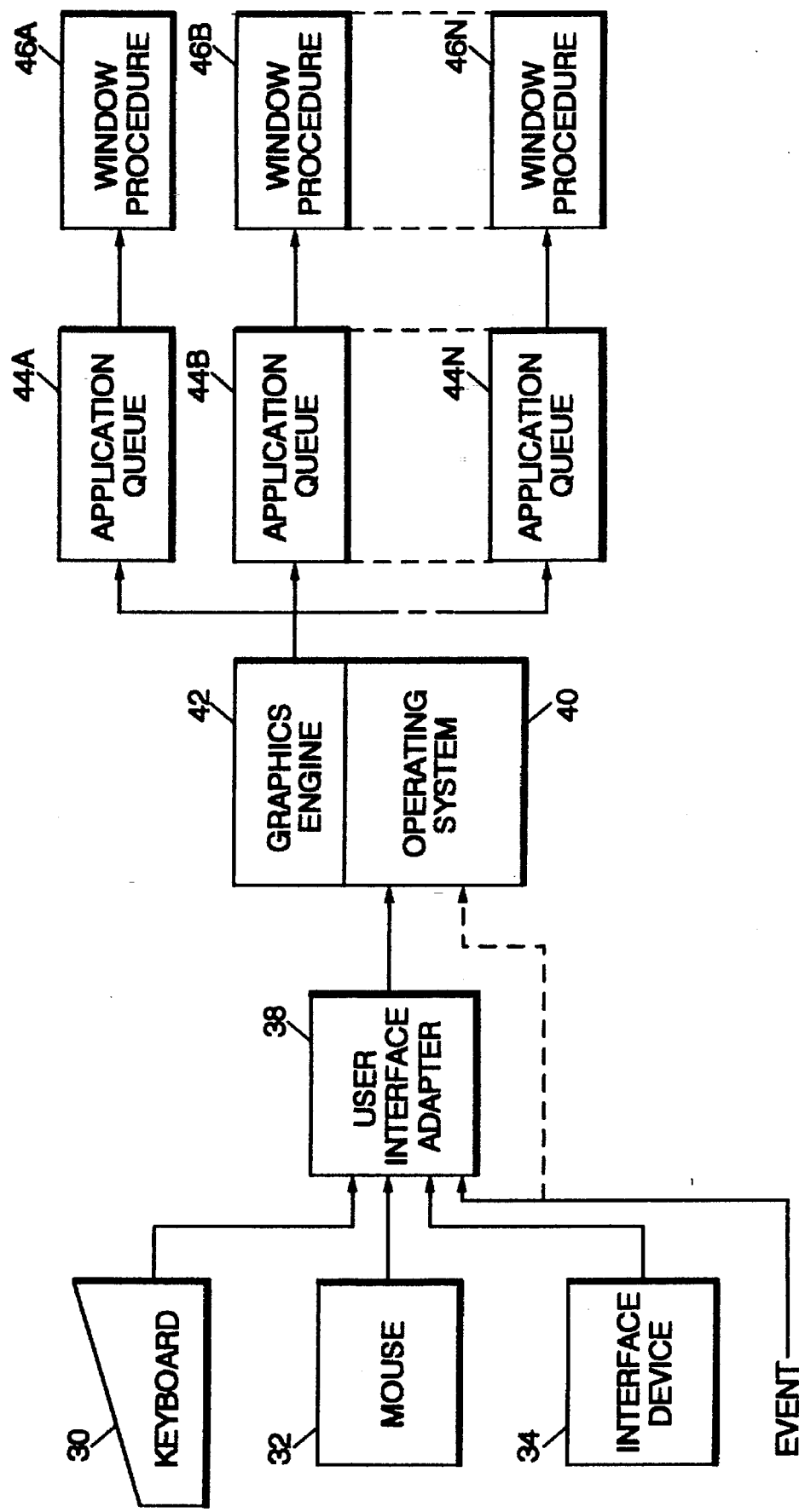
FIG. 2 is a block diagram of a prior art user interface environment illustrating the flow of data through the various components of the system.

FIG. 2 illustrates the flow of data through a known event-driven user interface system to programs or applications. Where the user interface is graphical in nature and comprises windows, the underlying application or program being addressed via a window is known as a window procedure. The present invention and the prior art will be described in terms of a window-based graphical user interface, but it will be appreciated by those skilled in the art that the same process and elements can apply to any type of user interface.

As those skilled in the art are well aware, a graphical user interface environment for a program is implemented with computer readable code, also known as software. The high level flowchart of FIG. 5 describes the logical steps carried out by software implementing the present invention. Software program code, which employs the present invention, is typically stored in the memory of a standalone workstation environment. The software program code may be embodied on any of a variety of known media for use with the data processing system, such as a diskette or CD-ROM. The software program code may be distributed on such media, or may be distributed over a network of some kind. Such techniques and methods for embodying software program code on media and/or distributing software program code are well known, and will not be further discussed herein.

When a user makes a selection/enters input at a user station via a user interface by means of a keyboard 30, mouse 32, or some other interface device 34, an "event" has occurred from the perspective of the system. The event is essentially a request that an application or program available to the user within the computing environment perform a desired function. An event need not necessarily be generated by a user, but can automatically occur due to the passage of time, etc.

To effect implementation of the desired function, the input or event is sent via the user interface adapter 38 to an operating system 40 resident in memory 26 (FIG. 1), which transfers the event to a window manager or graphics engine 42 (also resident in memory 26). The graphics engine 42 has associated therewith a number N of graphics engine application or message queues 44A–44N. Typically, each application queue 44 corresponds to an open window at the GUI. When a window is closed, its corresponding application queue 44 is destroyed- The operating system 40 and graphics engine 42 recreate the application queue 44 when the window is re-opened by the user, i.e., when the user wants to access a dormant program or a dormant portion of a running program which employs multiple windows. Accordingly, one or more graphics engine application queues 44 are provided for each application or window procedure 46 which is "open" at the GUI or available to be called by the user via the user interface, depending on the nature and complexity of the program. Each window procedure 46 is typically a C language program or routine resident in memory 26 and designed to provide a set of functions relative to one window available for manipulation by a user. The window procedure can be a word processing program, spreadsheet programs, etc.. The N window procedures 46A–46N are reactive in nature, in that they are idle until a message arrives for one of them in its corresponding message queue 44. Programs having reactive characteristics are inherently possible when written in the C programming language.

Upon occurrence of an event that requires an action or function to be performed by application (window procedure) 46A, the graphics engine 42 causes a message M to be placed in its corresponding application queue 44A. Depending on the state of the window procedure 46A, the window procedure 46A will (a) immediately pull the message M off the queue 44A and begin processing (if the window procedure 46A is idle), (b) finish processing relative to a prior message and then pull the message M off the queue 44A and begin processing (if the window procedure 46A was processing a prior message when the message arrived in the queue 44A), or (c) finish processing in progress relative to a prior message and then begin and complete processing relative to other prior messages stacked in the queue 44A before pulling the message M off the queue 44A and beginning processing with respect thereto (if one or more messages were already in the queue 44A when the message M arrived in the queue 44A). In short, the window procedure 46A pulls messages off of its corresponding message queue 44A in the order in which they arrive and performs the necessary processing relative to each message.

Depending on the message, the window procedure 46A either reacts to the event or returns the event to the graphics engine 42 to let the graphics engine 42 handle the message in a default manner. For example, in response to the message M, the window procedure 46A may require information to be displayed at the GUI. In this situation, the window procedure 46A requests the graphics engine 42 to display the appropriate information/graphics on the display device 22. Whatever the case, after making the appropriate response, the window procedure 46A pulls the next message off its corresponding message queue 44A. If no further message is present, the window procedure 46A returns to its idle state to wait for arrival of the next message in its queue 44A.

Figure 3:
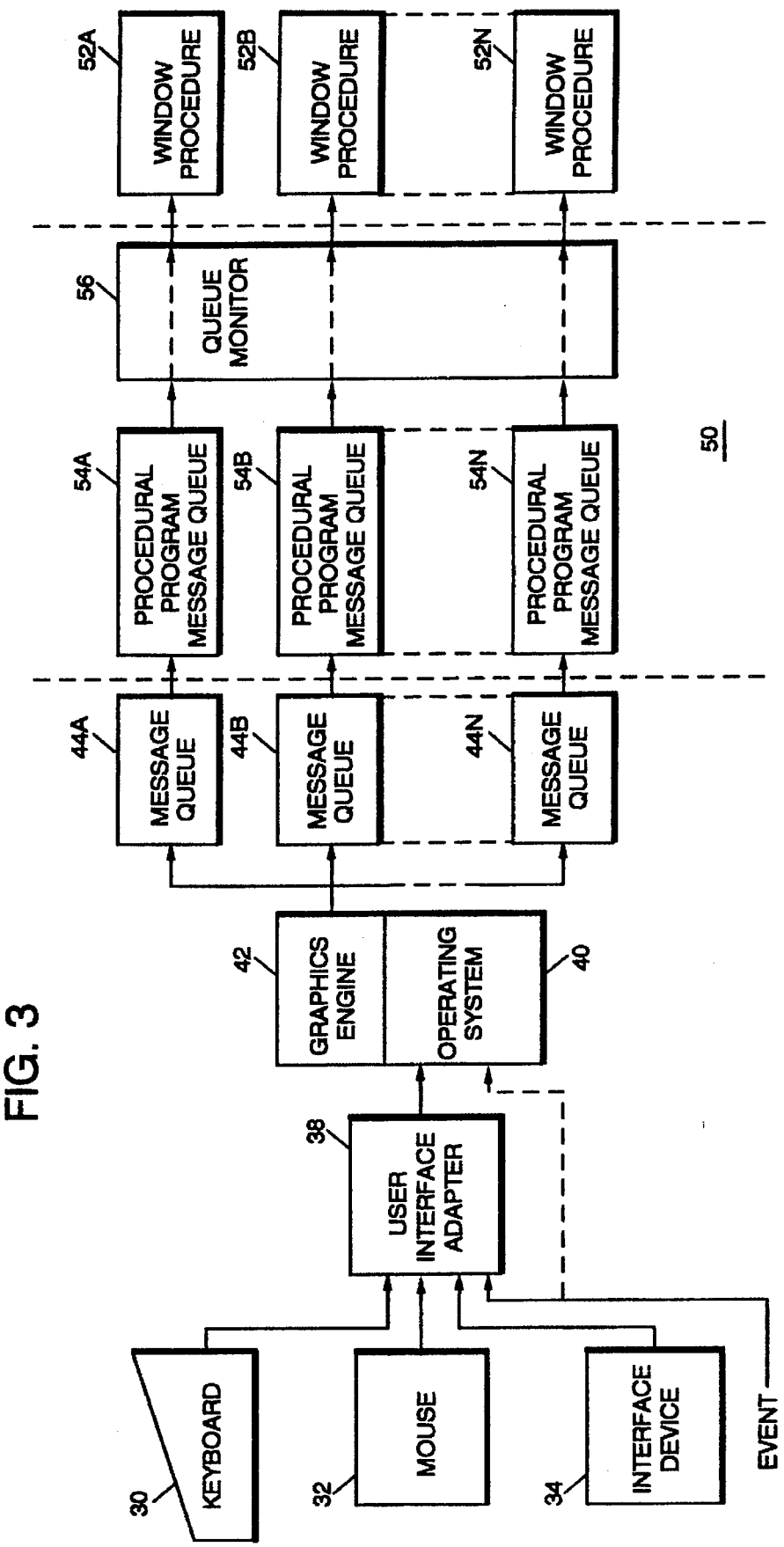
FIG. 3 is a block diagram which graphically illustrates in accordance with the present invention; and the flow of data through a user interface environment implemented

The problem solved by the present invention occurs when the window procedure is a fourth generation procedural program, such as a REXX program. As discussed above, fourth generational (4GL) procedural programs are not reactive, and thus will not interact reactively with the message queues, unlike C programs. The present invention will now be described below with reference to FIGS. 3 and 4.

In accordance with the preferred embodiment of the present invention, an interface 50 is logically positioned between the standard message queues 44A, . . . 44N and fourth generational procedural programs (window procedures) 52A, . . . 52N which are desired to operate in a reactive mode relative to input from a user at a user station. For example, the fourth generational procedural program can be a REXX language program or application, the graphics engine or window manager 42 can be any event-driven window management system, such as Presentation Manager (a registered trademark of the IBM Corporation), and the user station can be a personal computer or a work station.

As discussed above with respect to FIG. 2, when a user of the computer system selects an action at the interface by manipulating the keyboard 30, clicking on the mouse 32, touching a touch sensitive screen, etc., a message is sent to the user interface adapter 38 indicative of the action taken by the user. The message is passed on to the operating system 40 resident in memory, which forwards the message to the window manager 42, also resident in memory, for forwarding to the appropriate window procedure 52A, ... 52N for processing. As mentioned, the usual mechanism for passing messages to the appropriate window procedure are the window manager message queues 44A, ... 44N. As discussed relative to FIG. 2, each reactive window procedure 46 waits for a message to appear on it corresponding message queue 44 and reacts to the arrival of the message. However, procedural programs do not operate in this manner. Hence, the interface 50 effectively turns 4GL window procedures, which are procedural programs, into "reactive" programs.

The interface 50 provides one procedural program message queue 54 for each window manager message queue 44 established by the graphics engine 42. Whenever a message arrives on one of the window manager message queues 44, it is immediately forwarded to its corresponding procedural program message queue 54. The interface 50 also comprises queue monitor 56, which includes a polling function that constantly monitors the procedural program message queues 54A, ... 54N for messages. When a message is found to have arrived, the queue monitor 56 time stamps the message and maintains it in the queue 54 for subsequent delivery to the appropriate 4GL window procedure 52.

To make use of the interface 50, the 4GL window procedures 52A, ... 52N must be written to enable the interface 50 to send them messages held in the procedural program queues 54A, ... 54N. Accordingly, each procedural program 52 includes programming which provides for at least one periodic call to the queue monitor 56 and subroutines to respond to each potential message received in response to each call. When the interface 50 has received a message from the graphics engine 42, which relates to the 4GL window procedure 52, which made the call, the queue monitor 56 sends the 4GL window procedure 52 the message, or if more than one pertinent message has been received, the message with the earliest timestamp. Upon receipt of a message, the 4GL window procedure 52 goes into an appropriate subroutine, depending on the message received, to process the message, carry out the appropriate processing, etc. This is typically accomplished by using a switch statement, whereby the message is identified by the 4GL window procedure 52, at which time the 4GL window procedure 52 jumps to the appropriate subroutine included therein. When the subroutine is completed, and the appropriate processing and/or response generated and forwarded to the graphics engine 42, the 4GL window procedure 52 jumps out of the subroutine and calls the queue monitor 56 to see if another message is waiting. This process continues until no further messages have been received for the given window procedure 52.

Figure 4:
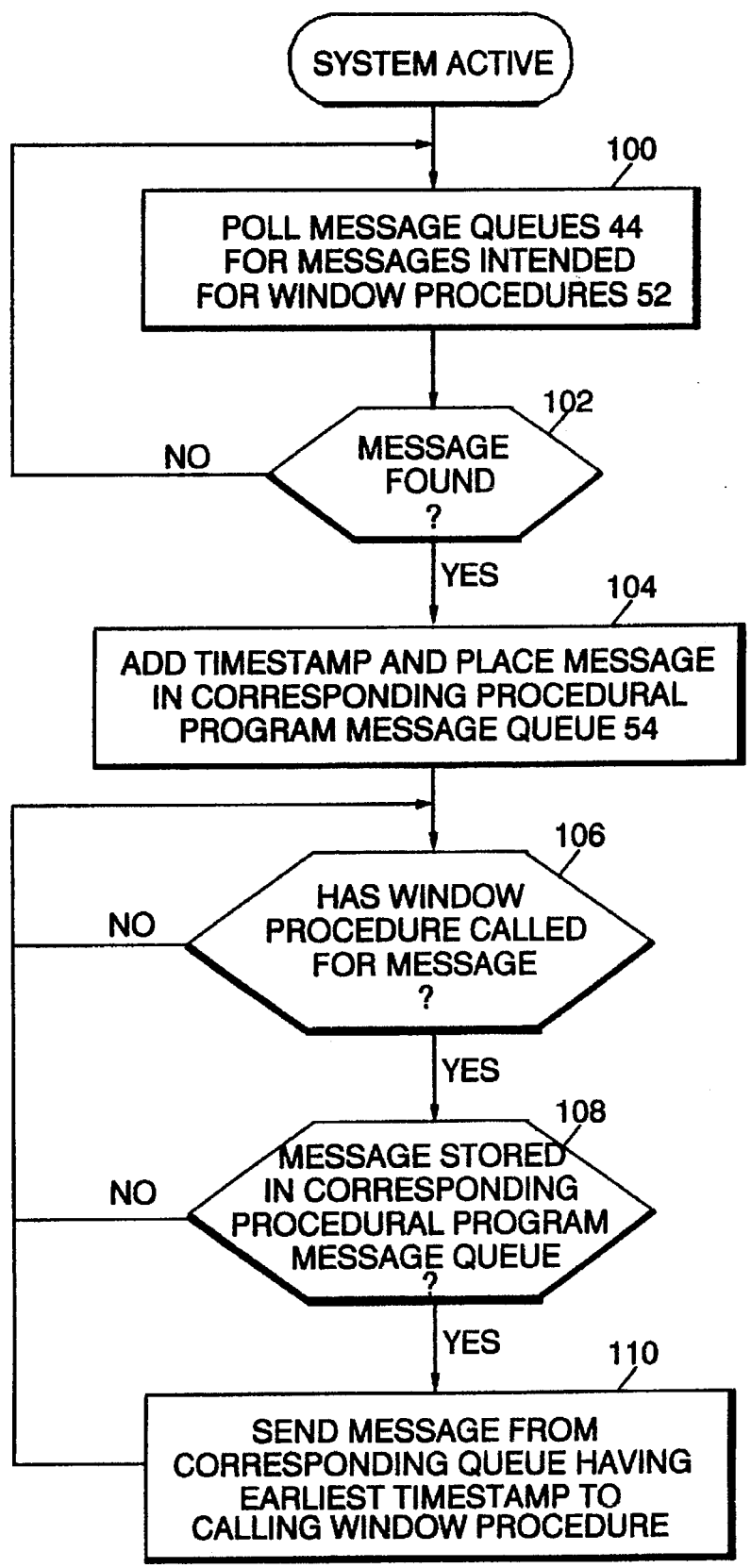
FIG. 4 illustrates a flow chart which sets forth the flow of data through an interface implemented in accordance with the present invention.

FIG. 4 illustrates a flow chart which shows the logical steps carried out by the interface 50. As indicated in Step 100, the queue monitor 56 of the interface 50 constantly polls all of the message queues 44A, ... 44N for incoming messages intended for one of the procedural program window procedures 52A, ... 52N. In Step 102, if a message is found in one of the message queues 44A, ... 44N, the queue monitor 56 causes a time stamp to be added to the message and the message is placed in the corresponding procedural program message queue 54A, ... 54N (Step 104). If no message is found in any one of the message queues 44A, ... 44N in Step 102, Step 100 is repeated. Steps 100 through 104 are carried out continuously and asynchronously.

The interface 50 in its role of enabling communication then waits for calls from the procedural program window procedures 52A, ... 52N (Step 106). When a call is received from one of the 4GL window procedures 52, the queue monitor 56 checks the procedural program message queue 54 which corresponds to the window procedure 52 which sent the call for a message (Step 108). If no message is found to be present in the corresponding procedural program message queue 54, the queue monitor 56 returns to Step 106 to wait for the next call from one of the procedural program window procedures 52. If one or more messages are found in the corresponding procedural program message queue 54, then the message within the corresponding procedural program message queue 54 having the earliest time stamp is sent to the procedural program window procedure 52 for processing. The result of the processing is treated in the same manner as done in the prior art.

Steps 106 through 110 are separate from Steps 100 through 104, and are carried out continuously and independently therefrom. After providing the procedural program window procedure 52 with a message from the corresponding procedural program message queue 54, the queue monitor 56 returns to a waiting condition and waits for new calls for messages from any of the window procedures 52.

The skills required to implement the subject invention are well within in the skills of those having ordinary skill in the art. While one embodiment of the invention has been discussed, it will be appreciated by those skilled in the art that various modifications and variations are possible without departing from the spirit and the scope of the invention.

We claim:

1. In a computing environment including a processor, a user interface, and memory, a system for enabling procedural programs written in a fourth generation procedural language to respond reactively to messages, comprising:

means for receiving input from the user interface;

an operating system for receiving the input from said receiving means;

a plurality of message queues for receiving messages from the operating system, one message queue corresponding to each procedural program accessible through the user interface; and procedural program interface means for determining whether a message is present in one of said message queues and providing the message to the corresponding procedural program following receipt of a call from the corresponding procedural program.

2. A system according to claim 1, wherein said procedural program interface means comprises a plurality of procedural program message queues, one corresponding to each of said message queues, for storing incoming messages from said message queues, and control means for monitoring receipt of the incoming messages, monitoring for calls from the procedural programs, and forwarding the messages to the procedural programs following receipt of calls therefrom.

3. A system according to claim 2, wherein said control means further timestamps messages as they are received by said procedural program message queues and provides a calling procedural program with the received message received first if more than one message is waiting for the calling procedural program.

4. A system according to claim 1, wherein the procedural programs are written in interpreted fourth generation procedural languages.

5. A method for providing messages to fourth generation interpreted procedural window procedures in a computing environment comprising processing means, a user interface, memory and an operating system resident in memory, comprising the steps of:

determining whether a message for one of the procedural window procedures has been sent from the operating system;

storing the sent message;

waiting for the procedural window procedure, which corresponds to the stored message, to issue a call for a waiting message; and providing the stored message to the calling procedural window procedure in response to the call.

6. A method according to claim 5, further comprising the step of timestamping the message upon receipt from the operating system.

7. A method according to claim 6, wherein said providing step further comprises providing the calling procedural window program with the first-received stored message if more than one message is stored for the calling procedural window program.

8. A system according to claim 4, wherein the procedural programs are written in REXX.

9. Computer readable code for permitting window procedures written in a fourth generation interpreted language to receive messages and react in an event-driven manner to the messages, comprising:

first subprocesses for determining whether a message is being sent to a fourth generation interpreted window procedure;

second subprocesses for storing the sent message, if any;

third subprocesses for waiting for a call to be received from the fourth generation interpreted window procedure to which the stored message was sent; and fourth subprocesses for sending the stored message to the fourth generation interpreted window procedure in response to the call.

* * * * *